(12) United States Patent
Nilsson

(10) Patent No.: US 6,431,116 B1
(45) Date of Patent: Aug. 13, 2002

(54) APPARATUS FOR PERFORMING ANIMAL RELATED OPERATIONS

(75) Inventor: Mats Nilsson, Norsborg (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/744,398
(22) PCT Filed: Jul. 23, 1999
(86) PCT No.: PCT/SE99/01302
§ 371 (c)(1), (2), (4) Date: Jan. 24, 2001
(87) PCT Pub. No.: WO00/04764
PCT Pub. Date: Feb. 3, 2000

(30) Foreign Application Priority Data

Jul. 24, 1998 (SE) .................................. 9802613

(51) Int. Cl.⁷ ................................ A01J 3/00; A01J 5/00
(52) U.S. Cl. .................................. 119/14.08; 119/14.14
(58) Field of Search ........................... 119/14.01, 14.08, 119/14.18, 14.14

(56) References Cited

U.S. PATENT DOCUMENTS

| | | | | |
|---|---|---|---|---|
| 5,479,876 A | * | 1/1996 | Street et al. | 119/14.08 |
| 5,865,138 A | * | 2/1999 | van der Lely | 119/14.08 |
| 6,167,839 B1 | * | 1/2001 | Isaksson et al. | 119/14.08 |
| 6,213,051 B1 | * | 4/2001 | Fransen | 119/14.01 |
| 6,227,142 B1 | * | 5/2001 | Birk | 119/14.08 |
| 6,269,767 B1 | * | 8/2001 | Hoppe et al. | 119/14.08 |

FOREIGN PATENT DOCUMENTS

| | | |
|---|---|---|
| EP | 0 300 115 | 1/1989 |
| EP | 0 774 203 | 5/1997 |
| GB | 2 226 941 | 7/1990 |

* cited by examiner

Primary Examiner—Charles T. Jordan
(74) Attorney, Agent, or Firm—Young & Thompson

(57) ABSTRACT

An apparatus for performing animal related operations includes a robot arm movable in response to a controller, the robot arm being provided with a gripper for gripping an animal related device. A sensor is adapted to establish a location of the animal related device.

19 Claims, 5 Drawing Sheets

APPARATUS FOR PERFORMING ANIMAL RELATED OPERATIONS

TECHNICAL BACKGROUND

Figure 1:
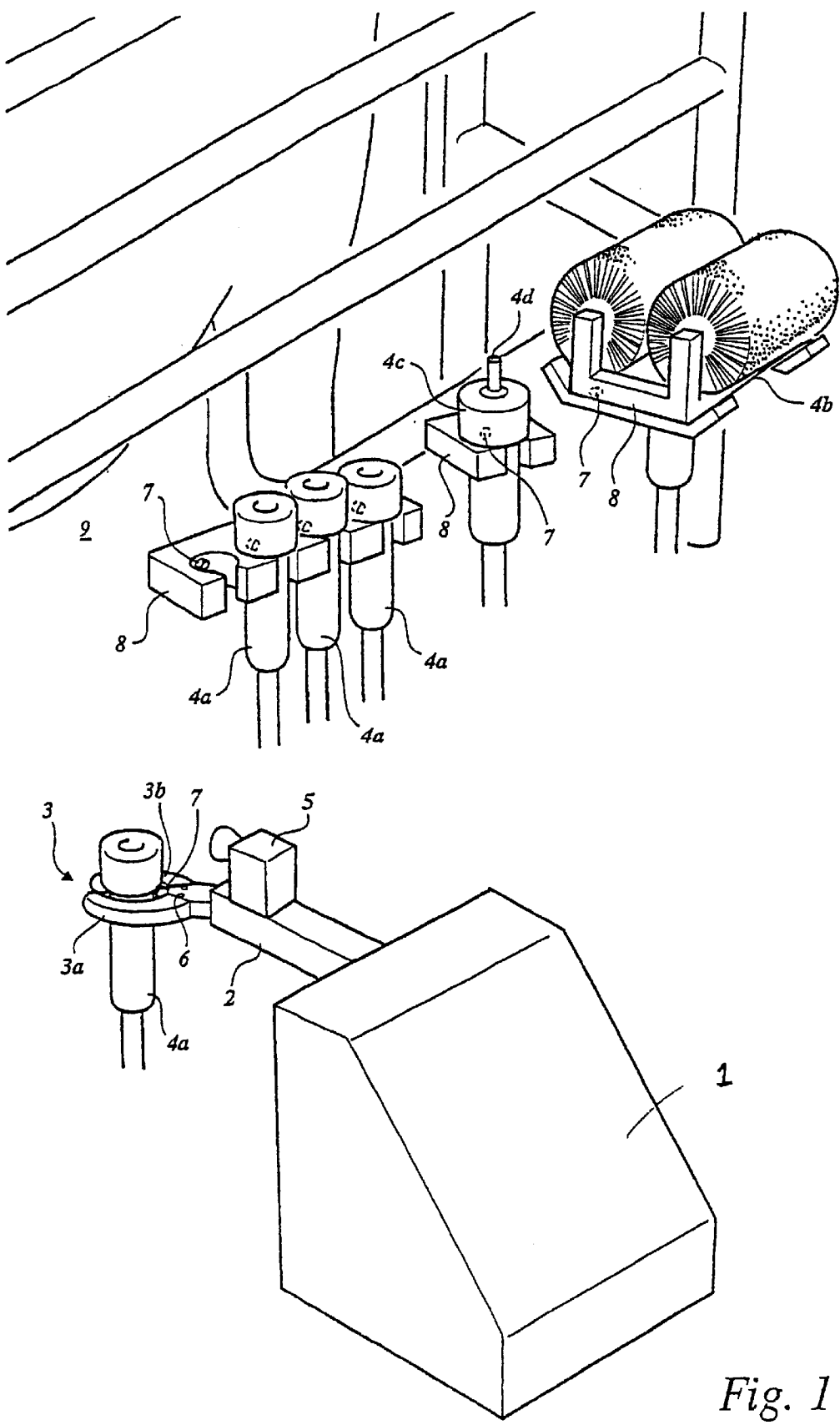

The present invention relates to an apparatus and a method for performing animal related operations comprising a robot arm movable in response to a control means, said robot arm being provided with a gripper for gripping an animal related means.

Such an apparatus and such a method are known from WO 97/15900.

OBJECT OF THE INVENTION

The known apparatus suffers from the drawback that the robot has not a complete control over associated equipment during the whole operation.

It is thus an object of the invention to overcome this drawback.

SUMMARY OF THE INVENTION

This object has been achieved by an apparatus and a method of the initially defined kind, which is characterised in that a sensor means is adapted to establish a location of said animal related means. According to one embodiment of the invention, the sensor means comprises at least one image capturing device associated with the control means for enhanced sensing performance.

Suitably, said sensor means is adapted to sense the presence of said animal related means at a predetermined location As only a predetermined location needs to be sensed, the sensor performs a fast establishment of the instantaneous location of the animal related means.

Preferably, said predetermined location is an animal stall. Hereby, the sensing is limited to a certain space.

Suitably, said predetermined location is a storage means for said animal related means. Hereby, the sensing is limited to positions, where the animal related means is expected to be located.

Preferably, said predetermined location is the gripper of said robot arm. Hereby, it is possible to establish whether the gripper has gripped an animal related means or not.

In particular, said sensor means is included in the storage means. Alternatively, or additionally, said sensor means is included in the gripper. In both cases, it is preferable that said sensor means comprises a contact sensor.

Suitably, said sensor means comprises at least one image capturing device associated with said control means. Hereby, it is possible to perform an overall establishment of the location of the animal related means.

Preferably, said control means is adapted to recognise different kinds of animal related means. Hereby, a fast comparison operation is achieved.

Suitably, said control means is adapted to perform image analysis of a captured image. Hereby, a means for performing said establishment is provided.

Preferably, said sensor means comprises a laser sensor adapted to project a laser line on said animal related means. Hereby, a distinct light beam is achieved.

Suitably, said animal related means is provided with at least one bar code. Hereby, it is possible to identify said animal related means Suitably, said animal related means comprises at least one teatcup. Alternatively, or additionally, said animal related means is a teat cleaning means. Alternatively, or additionally, said animal related means comprises a teat desinfection means.

Consequently, a complete control of the location of each different kind of animal related means is possible to be established.

Preferable would be to use the apparatus here described as well as the method for carrying out the objects of the present invention in an automated milking system.

DRAWING SUMMARY

Figure 2:
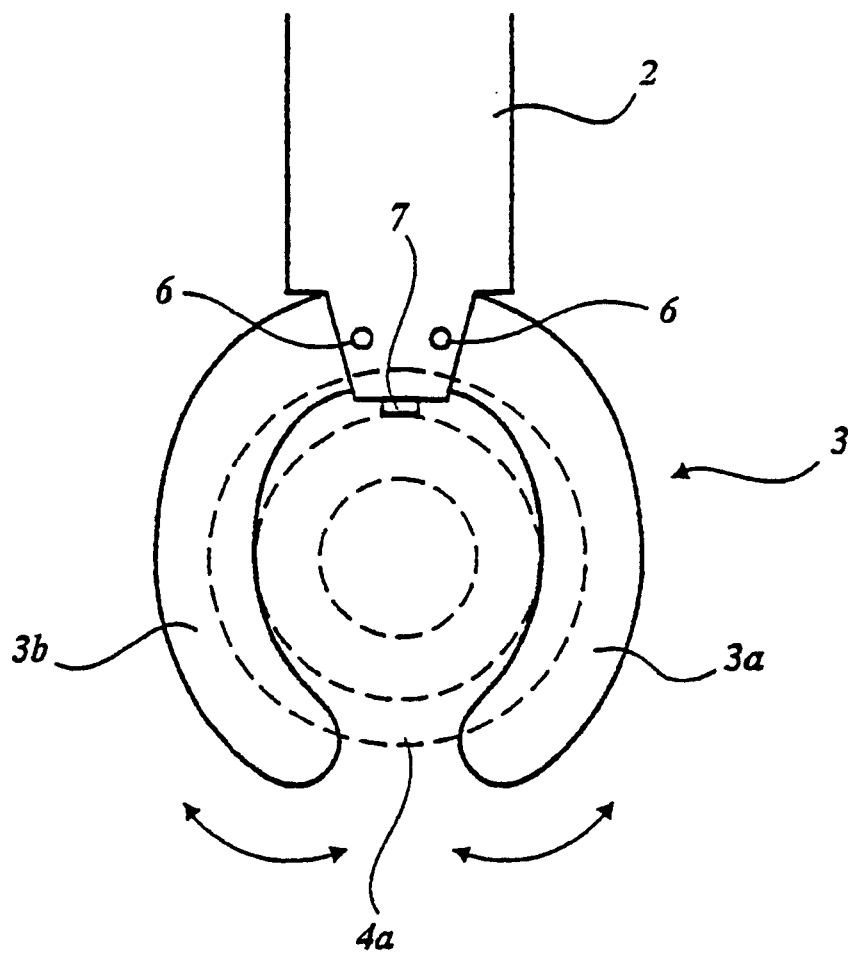
Figure 3A:
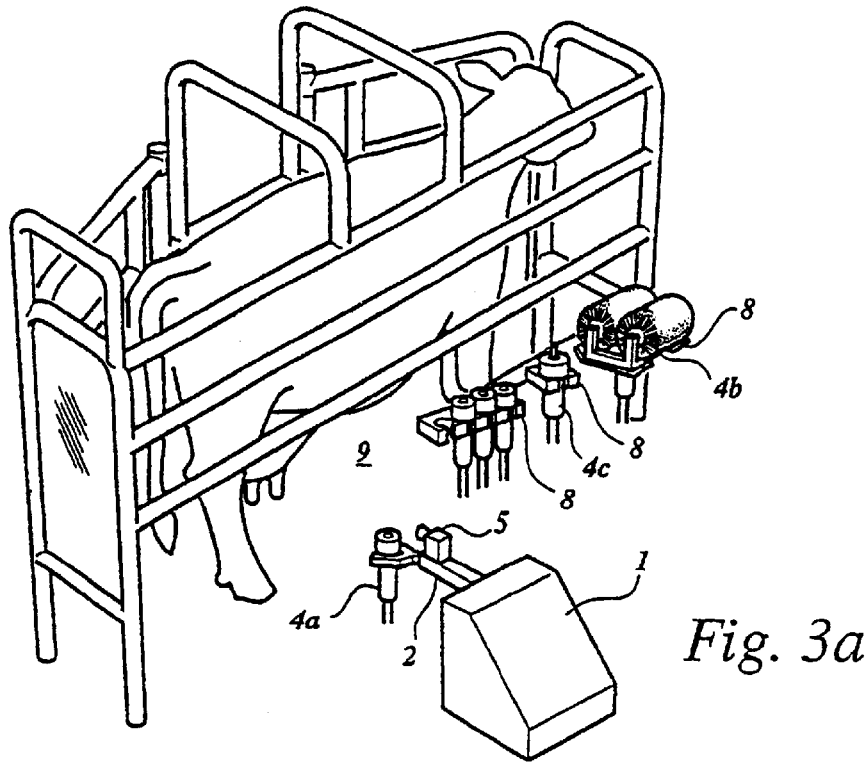
Figure 3B:
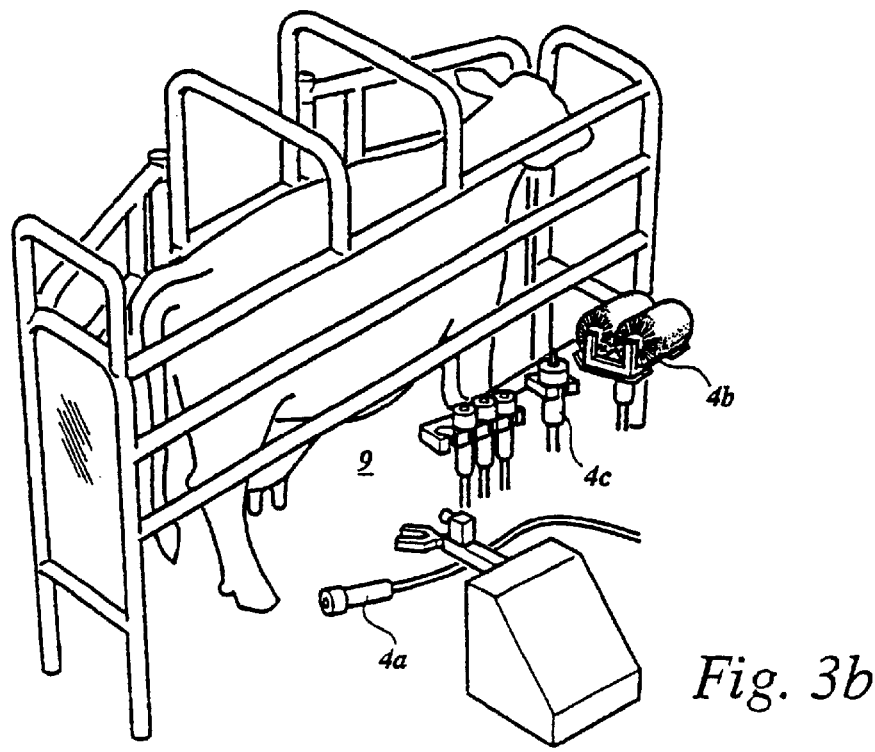
Figure 4A:
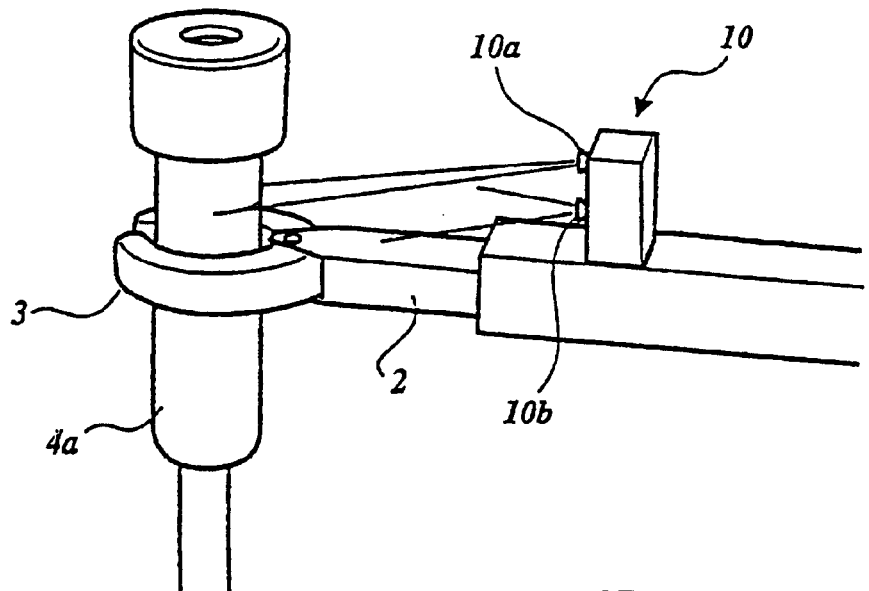
Figure 4B:
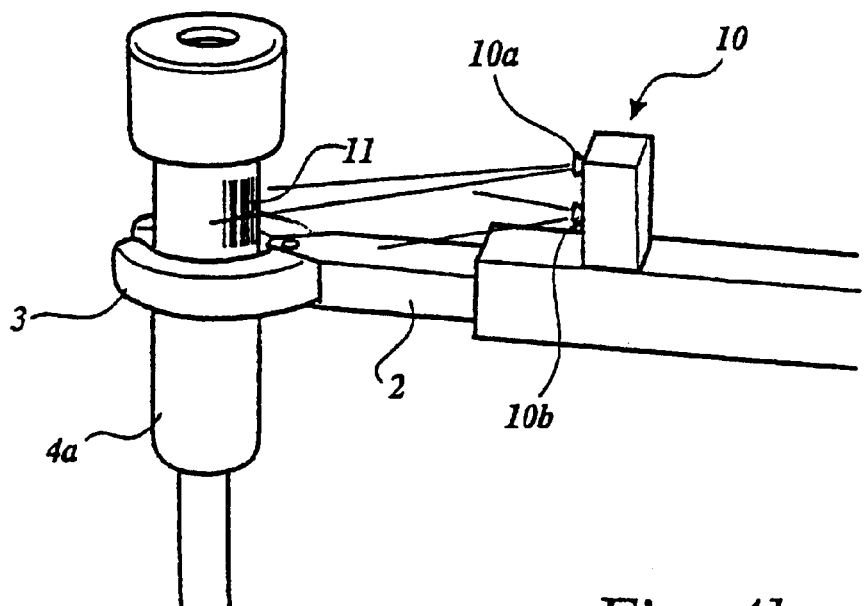
Figure 5A:
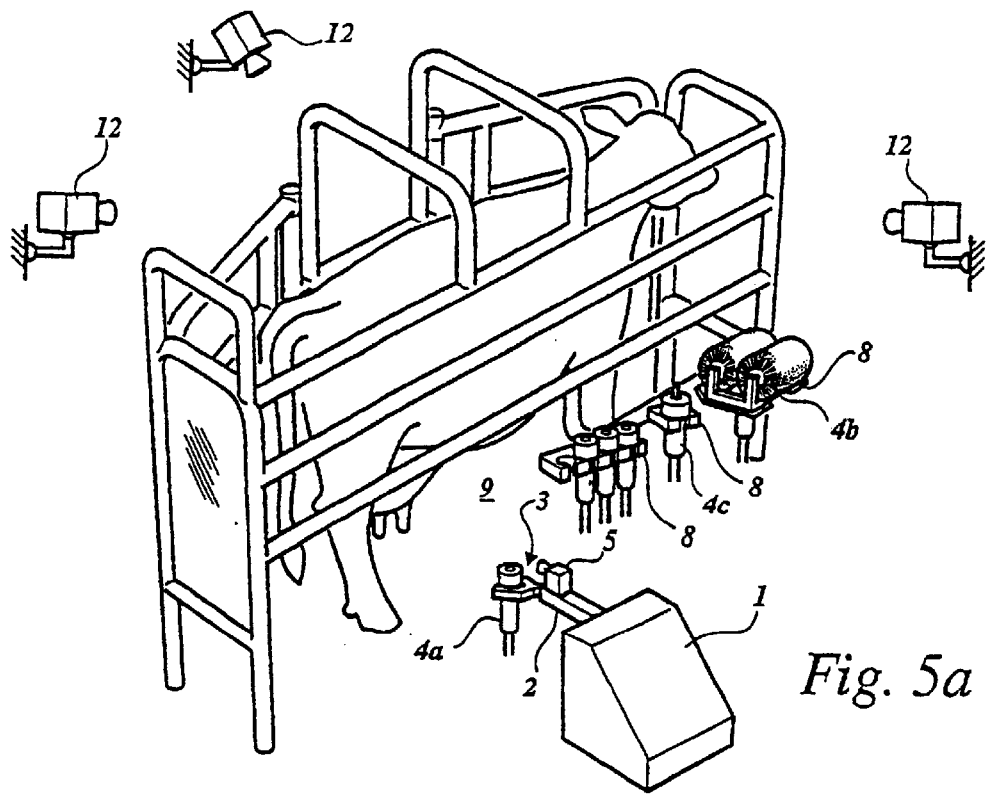
Figure 5B:
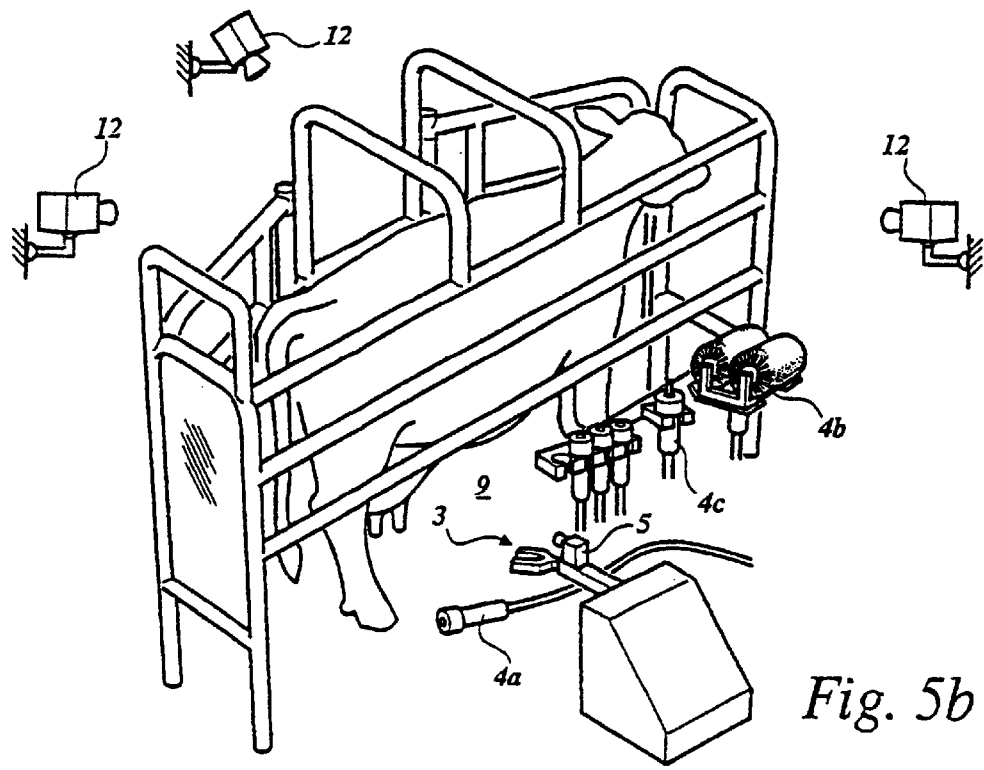

In the following, the invention will be described with reference to the accompanying drawings, in which:

FIG. 1 illustrates an apparatus with different animal related means provided with a sensor means according to a first embodiment of the invention, FIG. 2 is top view of a detail of the apparatus shown in FIG. 1, FIGS. 3a and 3b are perspective views of an animal stall provided with the apparatus shown in the above FIGS. 1 and 2, FIGS. 4a and 4b illustrate an animal related means, each of which is provided with a sensor means according to a second embodiment, FIGS. 5a and 5b are perspective views of an animal stall corresponding to FIGS. 3a and 3b, provided with a sensor means according to a third embodiment of the invention.

DETAILED DESCRIPTION

FIG. 1 shows a robot 1 having a robot arm 2 with a gripper 3 provided with gripping members 3a, 3b for gripping an animal related means, e.g. a teatcup 4a, a teat cleaning means 4b or a teat disinfecting means 4c provided with a spray nozzle 4d. An image capturing device 5 is provided for viewing for instance the udder of an animal, such as a cow, a goat, a sheep, a horse or a buffalo, in order to locate its teats.

The gripper 3 is shown in more detail in FIG. 2, which illustrates the gripper from above including a teatcup 4a, which is indicated with broken lines. Each gripping member 3a, 3b is movable about a hinge 6. Accordingly, the teatcup 4a is gripped by moving the gripping members 3a, 3b towards one another and is released by moving them away from one another. Furthermore, the rounded shape of the gripping members forces the teatcup 4a towards a sensor means 7 arranged on the robot arm 2 between the gripping members 3a, 3b.

The sensor means 7 is in the form of a contact sensor and is provided for sensing the presence of for example the teatcup 4a between the gripping members 3a, 3b. The contact sensor may be a push button, which is pressed towards the robot arm when the teatcup 4a is gripped by the gripping members 3a, 3b. Alternatively, it may be a metal detector, which senses a direct contact with the animal related means 4a, 4b; 4c made at least partly of metal. The gripping members 3a, 3b and the sensor means 7 are adapted to grip and sense the presence of the teat cleaning means 4b and the teat disinfecting means 4c as well.

The teatcups 4a, the teat cleaning means 4b and the teat disinfecting means 4c are stored in a common rack or separate racks 8 (see FIG. 1). Each rack 8 is provided with a sensor means in the form of a contact sensor 7 of the same kind as described above regarding the gripper. The contact sensor 7 of the rack 8 thus senses whether a relevant animal related means 4a, 4b, 4c is present in the rack or not.

The robot 1 and the racks 8 are arranged at an animal stall 9.

The robot arm 2, the gripper 3 and each contact sensor 7 are associated with at least one control means (not shown).

FIG. 3a shows the animal stall 9 of FIG. 1 from a larger distance. The animal related means 4a, 4b, 4c are easily reached by the gripper 3 of the robot arm 2. The gripper grips a relevant animal related means 4a, 4b, 4c and moves it towards an animal in the stall 9, and performs an animal related operation, such as teat cleaning, milking or teat desinfection FIG. 3b shows a situation where an animal related means e.g. a teatcup 4a has been dropped on the floor. None of the contact sensors 7 will hence sense the presence of that teatcup 4a The control means thus establishes the arisen situation as abnormal and indicates that the teatcup 4a must be picked up. Accordingly, the control means controls the robot arm to move the image capturing device 5 in such a way that it can view the animal stall. The dropped teatcup 4a is searched for and found by the image capturing device, and is subsequently picked up by the gripper 3 and cleaned, if needed. Alternatively, an alarm signal is generated and sent to a buzzer or a mobile telephone carried by the farmer.

Of course, the contact sensors 7 will not sense the presence of the teatcup 4a during milking, but the control means will not consider this an abnormal situation.

FIGS. 4a and 4b illustrate a second embodiment, in which the sensor means is a laser sensor 10 having a transmitter 10a for transmitting a scanning laser beam or a stable or scanning laser plane, resulting in a laser line projected on the animal related means, in FIGS. 4a and 4b represented as a teatcup 4a. The laser sensor 10 is furthermore provided with a laser reader 10b, such as a digital camera.

The teatcup 4a shown in FIG. 4a is recognised and identified by the length of the laser line projected onto it, in a way similar to the teat recognition method of WO 97/15900.

The teat cleaning means 4b and the teat disinfecting means 4c are recognised in the same manner.

It is thus possible not only to perform a fast establishment of the presence of the teatcup 4a in the gripper 3 or in the rack but also the kind of anal related means 4a, 4b, 4c.

As shown in FIG. 4b, the teatcup 4a is provided with a bar code 11. The laser reader 10b comprises a generally known bar code analysing unit.

It is accordingly possible not only to perform a fast establishment of the presence of the teatcup 4a in the gripper 3 or in the rack 8 and the kind of animal related means 4a, 4b, 4c, but also the identity thereof, i.e. which one of the teatcups 4a is gripped by the gripper 3 or is present in the rack 8.

It is furthermore possible to identify which teatcup 4a is or is not attached to a teat of the animal by moving the robot arm 2 towards the teatcup 4a on a teat or on the floor and transmitting or projecting a laser line on the teatcup 4a. The same of course relates to dropped teat cleaning means 4b, the teat disinfecting means 4c or any other animal related means provided with a bar code.

FIGS. 5a and 5b show a third embodiment in which a sensor means 12 in the form of at least one image capturing device is provided to view the stall and establish the presence of an animal related means 4a, 4b, 4c in the rack or racks 8 or in the gripper 3.

The robot arm 2, the gripper 3 and the image capturing device or devices 12 are associated with a control means (not shown), which analyses captured images, e.g. by contour analysis or colour analysis. In order to speed up colour (RGB) analysis, the animal related means 4a, 4b, 4c may be coloured. By applying different colours or colour combinations to different teats or animal related means 4a, 4b, 4c, it is also possible to identify the different teats and/or animal related means 4a, 4b, 4c and also to identify the different teatcups 4a.

If an animal related means 4a, 4b, 4c for example has been dropped on the floor, the control means controls the robot arm 2 to move towards the dropped item and grip it by means of the gripper 3. A more precise location of the dropped item is performed at a relative short distance by means of the image capturing device 5 arranged on the robot arm 2.

In all the described embodiments, it is possible to perform a routine check for the presence of the animal related means 4a, 4b, 4c in the rack or racks 8, e.g. after finished milking, for establishing that the equipment is ready to start milking another animal.

In the second and third embodiments, it is also possible to perform a routine check to make sure that the teatcups 4a are attached to the teats during milking.

It should be noted that the image capturing devices 12 may be used in combination with the sensor means 7 and/or 10 of the first and second embodiments.

It should furthermore be noted that the image capturing devices 12 in FIGS. 5a and 5b are unnecessary if an image capturing device 5 on the robot arm has good enough performance to view the whole desired area. In that case, the device 5 is in addition used for the same purpose as the image capturing devices 12.

What is claimed is:

1. An apparatus for performing animal related operations comprising a robot arm (2) movable in response to a control means, said robot arm (2) being provided with a gripper (3) for fetching at least one animal related means (4a, 4b, 4c), characterised in that
   a sensor means (7, 5, 10, 12) comprising at least one image capturing device (5, 12) associated with the control means is adapted to establish a location of said animal related means (4a, 4b, 4c).

2. An apparatus according to claim 1, characterised in that said gripper (3) is adapted to fetch said animal related means (4a, 4b, 4c) one after the other and to transport said means (4a, 4b, 4c) to its attachment position and then back.

3. An apparatus according to claim 1, wherein said sensor means is adapted to sense the presence of said animal related means at a predetermined location.

4. An apparatus according to claim 3, characterised in that said predetermined location is a storage means (8) for said animal related means (4a, 4b, 4c).

5. An apparatus according to claim 3, characterised in that said predetermined location is the gripper (3) of said robot arm (2).

6. An apparatus according to claim 3, characterised in that said sensor means (7) is included in the storage means (8).

7. An apparatus according to claim 6, characterised in that said sensor means (7) comprises a laser sensor (10) adapted to project a laser line on said animal related means (4a, 4b, 4c).

8. An apparatus according to claim 7, characterised in that said animal related means (4a, 4b, 4c) is provided with at least one bar code (11).

9. An apparatus according to claim 3, characterised in that said sensor means (7) is included in the gripper (3).

10. An apparatus according to claim 1, characterised in that said control means is adapted to recognise different kinds of animal related means (4a, 4b, 4c).

11. An apparatus according to claim 1, characterised in that said control means is adapted to perform image analysis of a captured image.

12. An apparatus according to claims 1, characterised in that said animal related means comprises at least one teatcup (4a).

13. An apparatus according to anyone claim 1, characterised in that said animal related means comprises a teat cleaning means (4b).

14. An apparatus according to claim 1, characterised in that said animal related means comprises a teat desinfection means (4c).

15. Automated milking system, characterised in that said automated milking system comprises an apparatus according to claim 1.

16. A method of performing animal related operation by means of a robot arm (2) movable in response to a control means, said robot arm (2) being provided with a gripper (3) for gripping an animal related means, characterised by the step of adapting a sensor means (5, 7, 10, 12) comprising at least one image capturing device (5, 12) associated with the control means to establish a location of said animal related means (4a, 4b, 4c).

17. A method according to claim 15, characterised by performing said establishment by the sensor means (5, 7, 10, 12) regularly, e.g. after performed milking.

18. Automated milking system, characterised in that said automated milking system comprises means for carrying out a method according to claim 15.

19. An apparatus for performing animal related operations, comprising:

a movable robot arm;

a gripper on an end of said movable robot arm for retrieving at least one animal related device;

a contact sensor on said gripper for sensing the presence of said at least one animal related device; and at least one image capturing device connected to said movable robot arm for identifying the location and type of said at least one animal related device.

* * * * *